Sept. 21, 1948. E. J. MARTIN ET AL 2,449,946
METHOD AND MEANS FOR DEMAGNETIZING
Filed Sept. 18, 1944 2 Sheets-Sheet 1

INVENTORS
Edward J. Martin &
BY Wayne T. Sprout
Blackmore, Spencer & Hint
ATTORNEYS Sept. 21, 1948. E. J. MARTIN ET AL 2,449,946
METHOD AND MEANS FOR DEMAGNETIZING
Filed Sept. 18, 1944 2 Sheets-Sheet 2

INVENTORS
Edward J. Martin &
BY Wayne T. Sproull
Blackmore, Spencer & Flint
ATTORNEYS Patented Sept. 21, 1948

2,449,946

UNITED STATES PATENT OFFICE 2,449,946

METHOD AND MEANS FOR DEMAGNETIZING

Edward J. Martin, Pleasant Ridge, and Wayne T. Sproull, Detroit, Mich., assignors to General Motors Corporation, Detroit, Mich., a corporation of Delaware Application September 18, 1944, Serial No. 554,576

4 Claims. (Cl. 175—181)

1

This invention relates to a method and means for reducing the magnetization of a body to a small constant value when averaged over a time period and more particularly to a method and means for magnetically erasing permanent magnetic fields in objects within which other magnetic means such as compass means are located. There are many instances in which it is desirable to mount compass means, which are, of course, normally affected by the earth's magnetic field, within outer or encasing means which are metallic and therefore themselves affect the earth's field when compass means are mounted therein or in juxtaposition to such metallic magnetic bodies. It is necessary to compensate for the presence of the metallic or magnetic mass before the compass will give a clear reading. While compensation is satisfactory in many instances inasmuch as the metallic or magnetic bodies are relatively stationary, sufficiently permanent compensation cannot be attained when the bodies are continuously moved or jarred such as in the case of jeeps or tanks. In those movable bodies, since they are affected by vibration, temperature change, and movement through the earth's field and assume different geographical directions, their magnetic characteristics change rapidly and therefore in order to obtain an accurate compass reading it would be necessary to continuously compensate for variations in the magnetic characteristics of the body. If a large magnetizable body is subjected to shock or vibration, its magnetic characteristics change. Also, if the body is subjected to changes in stress or strain or geographical position, the same is true.

It is therefore an object of our invention to provide a method and means for restoring a magnetic or metallic body to substantially a basic magnetic condition after it has been subjected to circumstances which might change its magnetic characteristics.

It is a still further object of our invention to provide a magnetic eraser which may be operated during the time of taking magnetic bearings.

With these other objects in view, the embodiments of our invention will be best understood by reference to the following specification and claims and to the accompanying drawings in which:

It is known that if an operator desires to demagnetize a metallic object, the same is inserted into a strong magnetic field which is periodically reversed and reduced gradually until it has reached substantially zero. Thus the magnetic field flowing in the part is alternately reversed to erase or eradicate the inherent magnetism in the part. Utilizing this as a basic theory and assuming that the article which it is wished to magnetically stabilize is a hollow box or rectangle, there are, of course, three different planes to consider; the vertical, horizontal and longitudinal. In each plane erasing forces or fluxes must be created. There may be magnetism in the planes of the front and rear faces for example. Also, in the two side faces and in the top and bottom. If, therefore, we can create alternately reversing fields in opposite faces sequentially the time average magnetism of the body can be reduced to a negligible amount.

Figure 1:
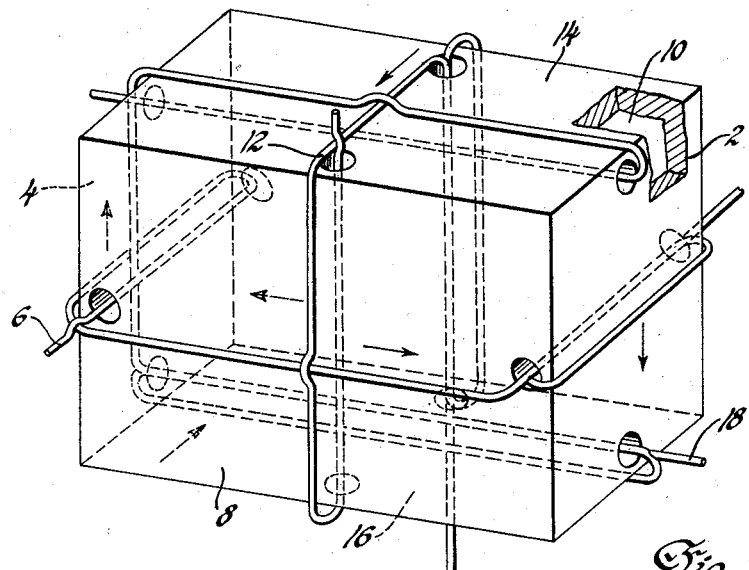
Figure 1 is a perspective view of a body having applied thereto schematic demagnetizing means.

Referring now more specifically to Figure 1, there is shown therein a hollow container which might represent the general outline of a tank, said container having front and rear walls 2 and 4 around which are wound a single continuous conductor 6 which makes a single loop around the rear wall 4 and then a single loop in series around the front panel 2. The two side panels 8 and 10 of the container have looped therearound in series relation two coils formed of the conductor 12 which in like manner makes a single loop around the side wall 8 and then a single series loop around the wall 10. The third plane has parallel thereto two plates such as the top plate 14 and the bottom plate 16 and a flux is created in these by conductor 18 which makes a single loop around the lower plate 16 and then a series loop around the upper plate 14. In each instance the coils are so wound that the magnetization in each of the two sides lying in spaced parallel planes, such as the top and bottom, is at any given instant in opposite directions. If we now connect these different series coils sequentially to a power supply and alternately reverse the flow, there will be created in the total inclosure magnetic fields in the different planes which will sequently reverse, such action erasing or substantially reducing the time average of the inherent magnetism of the inclosure so that magnetic readings may be taken therein.

Figure 2:
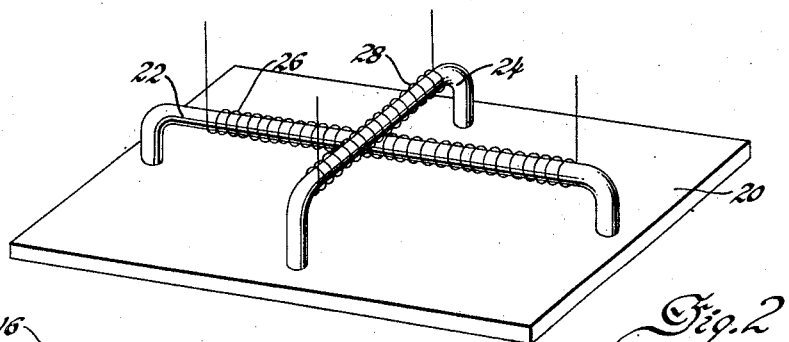
Figure 2 is a perspective view of a pair of stabilizing coils as applied to a flat plate.

In an article the size of a tank, however, it would, of course, be impractical to attempt to coil or loop the wires around parts such as the enclosing walls thereof and in order to introduce the created flux into the panels, rods having short angled ends rigidly secured to such panels by welding or otherwise fixedly securing the same are provided. Figure 2 illustrates how two rods can be applied to a flat plate to magnetically stabilize the same in two different planes. A sheet 20 has rigidly secured thereto rods 22 and 24 which in both instances have their ends welded to said plate at right angles to each other. Each rod is wound with a coil 26 and 28 respectively for creating a flux which will flow through the rod and into the plate. Thus when current flows through the coils a sheet of flux is set up in the plate in the directions of the rods and since the sheet plate 20 shown has very little third dimension, it can be magnetically stabilized for all practical purposes by only creating flux paths in the two directions.

Returning to the initial problem of creating a constant and small average magnetization in a large structure such as a tank by using the rods similar to 22 and 24 of Figure 2, the same may be applied to the inner surface of the tank walls such as the front and rear walls, side walls and top and bottom. Then by having these six regions of introduction of flux and as before mentioned sequentially introducing and alternately reversing the same, magnetic stabilization of the body may take place. It is important, however, to introduce the same available current generated flux for the same length of time in each different direction to produce satisfactory results. It is therefore necessary to provide switching means for controlling the flow of current to these magnetic coils preferably controlled from a common source so that the timing may be the same.

Figure 4:
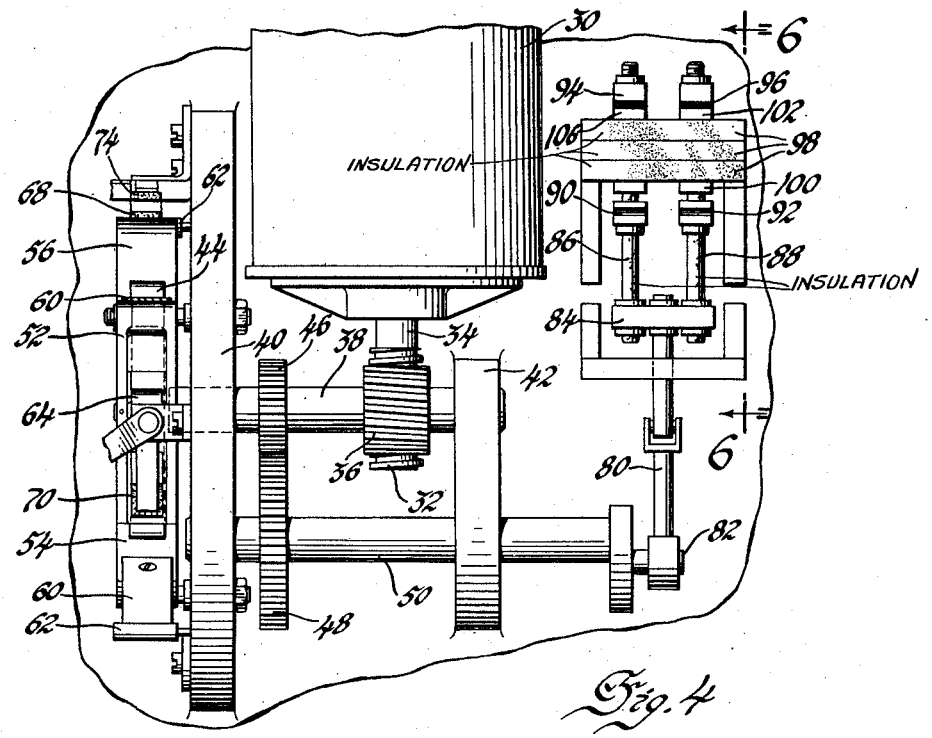
Figure 4 is a top plan view showing the electrical switching means utilized in our invention.
Figure 5:
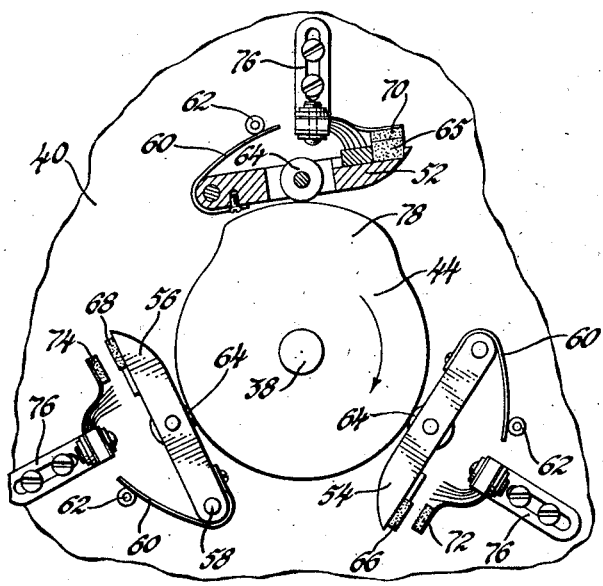
Figure 5 is a side elevation of a portion of said switching means.
Figure 6:
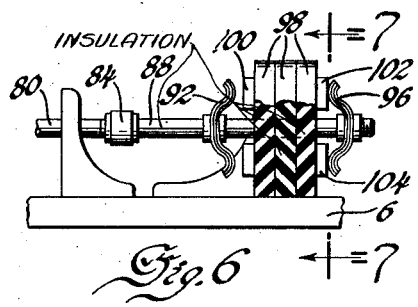
Figure 6 is a view partially in section taken on line 6—6 of Figure 4.
Figure 7:
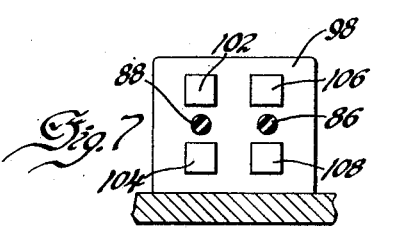
Figure 7 is a sectional view taken on line 7—7 of Figure 6.

Such a switching mechanism is shown in Figure 4 in which a small control motor 30 has a worm gear 32 mounted upon its shaft 34 and drives a worm wheel 36 on power shaft 38 which is properly trunnioned in stationary uprights 40 and 42 from a base. One end of the shaft 38 extends through support 40 and carries thereon a control cam 44. Shaft 38 also has a transfer gear 46 mounted thereon which meshes with a similar gear 48 mounted on parallel shaft 50 which is likewise trunnioned in the two uprights. Upright 40 has mounted thereon a series of cam followers 52, 54 and 56 which are mounted around the periphery of the cam 44 and pivoted at one end as at 58. Around each pivot there is a spring member 60, one end of which is rigidly secured to a follower, the opposite end being forced against a small pin 62 tending to force the cam follower in a clockwise direction around its pivot and to maintain the same in contact with the cam. In the central portion of each of the followers there is mounted a small wheel 64 which is adapted to contact the cam surface and thus reduce friction between the follower and the cam.

The end of each cam follower opposite to the pivot carries a contact member such as 65, 66 and 68 which is adapted to engage associated contact 70, 72 or 74 respectively. These latter contacts each are mounted on spring arms spaced peripherally around the cam and are radially adjustably mounted on the face of the upright 40 such as through screw and slot connections 76 so that they may be moved toward and away from the axis of the shaft 38. It will thus be evident that if the lobe 78 comes in contact with one of the different wheels 64 it will force that particular follower outwardly and cause the two switch contacts to complete the circuit for that length of time during which the wheel 64 for that particular follower rides on the lobe. It will also be noticed that these followers are spaced at substantially 120 degree intervals around the periphery of the cam. Thus during one revolution of the shaft 38 each of the switches is closed for a same certain period of time. These switches, of course, control the circuits to the three groups of coils previously described.

Upon the next revolution of the shaft 38, however, it is desired to have the current flow through each coil in the opposite direction and create an opposed field and therefore when the shaft 38 has made one revolution, means must be provided to reverse the connections before it starts on its next revolution. Such means is provided by a reciprocating rod 80 which is connected to an eccentric pin on the end of shaft 50, thus rod 80 reciprocates longitudinally as shaft 50 rotates. Rod 80 is connected to a plate 84 which carries two parallel rods 86 and 88 which in turn carry, in spaced relation, flexible conducting means 90, 92, 94 and 96. These rods 88 and 86 pass through a stationary bearing block 98 which carries on its opposite faces contactors such as 100, 102, 104, 106 and 108 which cooperate with the conducting means 90, etc., to reverse the connections to the coils. The gear ratio of 46 and 48 is 1 to 2 so that the cam 44 makes a complete revolution during the time that the shaft 50 makes one-half a revolution and therefore shaft 50 changes the contacts each time the cam 44 has made one complete revolution.

Figure 3:
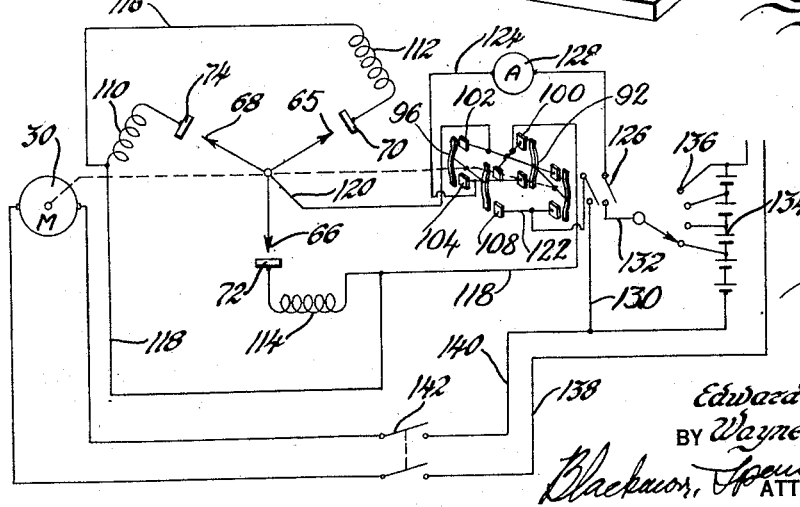
Figure 3 is a schematic diagram showing the electrical connections of the system embodying our invention.

Referring now more specifically to Figure 3, there is shown therein diagrammatically the physical contacts just described in which the contacts 65, 66 and 68 are shown as spaced 120 arcuate degrees apart and cooperating with the substantially stationary contacts 70, 72 and 74 which control the energization of coils 110, 112 and 114 which are those used for the magnetic erasing. A conductive line 116 connects coil 112 to coil 110 and line 118 connects coil 110 to coil 114 and to one contact 100 of the reversing switch which is diagonally cross connected. The common terminal of the cam switches is connected through line 120 to a second cross connection of the reversing switch. One of the pairs of terminals of the reversing switch is connected through line 122 to one switch pole of switch 126. The other pair of terminals of the reversing switch is connected through line 124 to an ammeter 128 and then on to the other terminal of the switch 126. The stationary contacts of switch 126 are connected through lines 130 and 132 to a source of power such as a battery 134, line 132 having therein an adjustable tap portion 136 so that different values of voltage may be applied. Lines 138 and 140 are also connected to the battery 134 and conduct current to the control motor 30 which drives the various switches, said line having therein a switch 142 to control energization of said motor.

It will thus be obvious that in any body which it is desired to magnetically stabilize there are first applied coils on the opposite faces through which there is created therein magnetic flux flowing in alternately opposite directions, that this flux is applied for a predetermined time interval by any one pair of coils and when they are deenergized two other coils in two other parallel surfaces are then energized for a period and as soon as that period has been completed, power is then applied to the coils in the remaining surfaces. As soon as all of the planes have been energized in sequence, they are re-energized with an opposite flow of current of the same power and for the same period of time to create in each panel or plane a reversing flux. This results in a time average demagnetization of the plates sufficient to make possible an accurate reading of the compass instrument during operation of the device which may be within or adjacent to the magnetic means.

We claim:

1. In a method for effecting a time average demagnetization of a three dimensional body, the steps of providing a source of power having a given polarity, sequentially creating magnetic fields in the body in three planes at right angles to each other from said source, then reversing the polarities of the applied power, sequentially creating the magnetic fields in the same order and respective strength as before, and continuously respecting the above sequence.

2. In means for effecting a time average demagnetization, separate means for creating three separate magnetic fields oriented in three mutually perpendicular planes, a source of D. C. power, and switching means interconnecting the source and magnetizing means to sequentially connect each of the separate magnetizing means and to reverse the polarity after each sequence.

3. In means for effecting a time average demagnetization, a three dimensional body formed of magnetizable material, magnetizable rods rigidly secured to the surfaces of the body in three planes at substantially right angles to each other, coils wound upon said rods, a source of power and switching means interconnecting said coils and said source of power to connect said coils to the source in a predetermined sequence and to reverse the polarity at the end of each full sequence.

4. In means for effecting a time average demagnetization, a three dimensional body formed of magnetizable material, magnetizable rods rigidly secured to the surfaces of the body in three planes at substantially right angles to each other, coils wound upon said rods, a source of power, switching means between the source and each coil, a single operating means for actuating said switching means in sequence, polarity reversing means connected in series with all the switching means and synchronized driving means for the switching and reversing means so that the switches will be actuated in sequence and the polarity reversed once per sequence.

EDWARD J. MARTIN.
WAYNE T. SPROULL.

REFERENCES CITED

The following references are of record in the file of this patent:

UNITED STATES PATENTS

| Number | Name | Date |
|---|---|---|
| 250,273 | Maxim | Nov. 29, 1881 |
| 1,994,793 | Scofield | Mar. 19, 1935 |
| 2,267,838 | Polin | Dec. 30, 1941 |
| 2,306,584 | Zuschlag | Dec. 29, 1942 |
| 2,388,683 | Frickey et al. | Nov. 13, 1945 |
| 2,412,617 | Jenkins | Dec. 17, 1946 |
| 2,414,556 | Rawlins et al. | Jan. 21, 1947 |

FOREIGN PATENTS

| Number | Country | Date |
|---|---|---|
| 566,126 | France | Nov. 17, 1923 |
| 757,710 | France | Oct. 16, 1933 |

Certificate of Correction

September 21, 1948.

Patent No. 2,449,946.

EDWARD J. MARTIN ET AL.

It is hereby certified that errors appear in the printed specification of the above numbered patent requiring correction as follows:

Column 4, line 35, for "1 to 2" read *2 to 1*; column 5, line 27, claim 1, for the word "respecting" read *repeating*;

and that the said Letters Patent should be read with these corrections therein that the same may conform to the record of the case in the Patent Office.

Signed and sealed this 3rd day of May, A. D. 1949.

[SEAL]

THOMAS F. MURPHY,
*Assistant Commissioner of Patents.*